US006387492B2

(12) United States Patent
Soane et al.

(10) Patent No.: US 6,387,492 B2
(45) Date of Patent: May 14, 2002

(54) HOLLOW POLYMERIC FIBERS

(75) Inventors: David S. Soane, Piedmont; Michael R. Houston, Berkeley, both of CA (US)

(73) Assignee: Nano-Tex, LLC, Emeryville, CA (US)

( * ) Notice: Subject to any disclaimer, the term of this patent is extended or adjusted under 35 U.S.C. 154(b) by 0 days.

(21) Appl. No.: 09/840,317

(22) Filed: Apr. 23, 2001

Related U.S. Application Data

(62) Division of application No. 09/458,220, filed on Dec. 9, 1999, now Pat. No. 6,221,486.

(51) Int. Cl.$^7$ .................................................. D01F 6/00
(52) U.S. Cl. ........................ 428/376; 428/398; 428/221
(58) Field of Search ................................ 428/364, 376, 428/398, 221

(56) References Cited

U.S. PATENT DOCUMENTS

| | | | |
|---|---|---|---|
| 3,847,719 A | 11/1974 | Crowley | 424/85 |
| 4,787,308 A | 11/1988 | Nakagama et al. | 521/53 |
| 5,061,418 A | 10/1991 | Ware | 264/46.1 |
| 6,221,486 B1 | 4/2001 | Soane | 428/364 |

OTHER PUBLICATIONS

Hawley's Condensed Chemical Dictionary, 12$^{th}$ Ed., pp. 325, 331, 332 and 936, Van Nostrand Reinhold Co., NY (1993).

Encyclopedia of Polymer Science and Engineering, vol. 2, pp. 434–446 (1985, rev. ed. of 1964).

Primary Examiner—Newton Edwards
(74) Attorney, Agent, or Firm—Jacqueline S. Larson

(57) ABSTRACT

The present invention is directed to thermo-expandable fibers and to the expanded hollow fibers or microtubes, microcellular foam or foamed composite material that results upon heating the expandable fibers. The thermo-expandable fiber of the present invention is characterized by having a polymeric wall surrounding one or more pockets or particles of blowing agent or propellant within the fiber. The polymeric wall may have reactive functional groups on its surface to give a fusible fiber. When the expandable fibers are heated, they expand to form hollow fibers or microtubes comprising polymeric shells surrounding one or more internal gaseous voids, and when the fibers are expanded while in contact with each other, a microcellular foam may be formed. The foam consists of a plurality of hollow fibers fused together, optionally aided by functional groups present on the surface of the heated fibers that act to crosslink the material. When expandable microspheres are mixed with a matrix, which can optionally react with functional groups on the fiber surface, and the resulting combination is heated, the fibers expand to give a foamed composite material in which the hollow fibers or microtubes may optionally be fused or chemically crosslinked to the matrix.

22 Claims, No Drawings

HOLLOW POLYMERIC FIBERS

This application is a divisional of Ser. No. 09/458,220 filed on Dec. 9, 1999, U.S. Pat. No. 6,221,486.

FIELD OF THE INVENTION

This invention relates to the field of plastic fibers, more specifically to the fields of expandable, fusible, and hollow plastic fibers or microtubes, and composite materials produced therefrom.

BACKGROUND OF THE INVENTION

In the current state of the art, the production of hollow fibers is greatly hindered by the required extrusion process using an annular die, which makes the production of fibers having a small cross-sectional area very difficult. Such processes are also sensitive to the polymer composition being extruded, limiting the variety of compositions available for practice. Hollow fiber production is further limited because hollow fibers are especially prone to breakage, rupture, or other defects during any draw-down (spinning) process, which further limits the size, geometries, and other physical properties typically achieved during a conventional spinning process.

Another limitation of the current art is the control (or lack thereof of the polymer molecule orientation in the final hollow fiber. In conventional hollow fiber production, the polymer molecules become oriented, at least partially, in the longitudinal direction by the extrusion and/or spinning process. While this may benefit the strength of the fiber in the longitudinal direction, it actually can degrade other properties such as its resistance to collapse, crushing, fraying, crimping or other failure modes of the fiber. Thus, a technique capable of providing or imparting some degree of radial orientation to the polymer molecules in the shell wall of the fiber is desirable. Such radial orientation of the polymer chains is not currently achievable in the current art, yet would provide the hollow fibers with heretofore unattainable properties, even if only partial radial orientation could be achieved.

SUMMARY OF THE INVENTION

The present invention is directed to thermo-expandable, thermoplastic or thermosettable fibers, their method of production, and the microtubes or hollow fibers that result upon heating said thermo-expandable fibers. The thermo-expandable fibers of the present invention are characterized by having a polymeric wall surrounding a core of liquid or solid blowing agent or propellant within the fiber. The fibers may be cylindrical in shape, having a circular cross-section. Or they may have other various geometries, such as oval, star-shaped, or triangular cross-sections. The "fibers" may even possess a cross-section that has a large aspect ratio so that they resemble a sheet. The fibers may additionally be designed to possess multiple, parallel cores instead of a single core. The fibers themselves can be singular and independent from one another, or they may be agglomerated together and pressed flat to form non-woven sheets or membranes consisting of many fibers. In one embodiment of the invention, the expandable fibers of the present invention are also fusible or crosslinkable with each other and/or with a surrounding matrix material in which the fibers are mixed.

The terms "thermo-expandable fiber" and "expandable fiber" as used herein and in the appended claims, mean a strand that is many times longer than it is wide and is capable of increasing in size upon heating due to the formation of one or more continuous or segmented voids or bubbles in the interior of the fiber. The terms "hollow fiber" and "microtube" as used herein and in the appended claims, mean a hollow fiber defined by having a polymeric shell wall surrounding one or more continuous or segmented internal, gaseous voids. The term "fusible", as used herein and in the appended claims, means able to fuse together into an agglomerated or connected mass.

The present invention discloses a unique approach that overcomes the drawbacks of commercially established processes for the production of microtubes or hollow fibers. It is unique in that it uses only physical processes and solution thermodynamics to create novel expandable fibers. The expandable fibers in turn form the hollow fibers or microtubes upon heating and/or depressurization. Polymerization is an optional but not requisite step in the fiber formation process of this invention. The process is also unique in that any pre-polymerized material having a suitable solvent may be used to form the fiber shell walls, irrespective of the polymerization technique used to synthesize the polymer. By selecting functional polymers that have reactive sites within the polymer chain, and/or by incorporating crosslinking agents into the polymer walls, expandable fibers may be readily produced which are fusible or crosslinkable with adjacent fibers or with a matrix material in which the fibers have been incorporated. For these reasons and others that will become clear, the present invention is an extremely economical process suitable for mass production.

In one embodiment of the process of the invention, a polymer, co-polymer, or polymer blend is solvated by an appropriate solvent, and combined with an inert liquid, which serves as a blowing agent or propellant. Optionally, crosslinkers, catalysts, plasticizers, stabilizers, pigments, and other desirable additives may be added to the mixture. Fiber spinning proceeds by extruding or ejecting the mixture through an orifice into air or a second immiscible liquid to produce strands. Either by evaporation or liquid-liquid extraction, the solvent is then removed from the strands, precipitating the polymer from solution and effectively solidifying the strands into hard-walled expandable polymeric fibers containing liquid blowing agent cores and other optional additives.

In another embodiment of the process of the invention, a polymer, co-polymer, or polymer blend is solvated by an appropriate solvent, and is combined with a solid that produces a gas upon heating. Optionally, crosslinkers, catalysts, plasticizers, stabilizers, pigments, and other desirable additives may be added to the mixture. Fiber spinning proceeds by extruding or ejecting the mixture through an orifice into air or a second immiscible liquid to produce strands. Either by evaporation or liquid-liquid extraction, the solvent is then removed from the strands, precipitating the polymer from solution and effectively solidifying the strands into rigid-walled expandable polymeric fibers containing blowing agent cores that are solid at room temperature.

Utilizing either method, the final product is a fiber that is dispersible, residue-free, thermoplastic or thermosetting, and expandable. The polymer, co-polymer, or polymer blend may be chosen from any existing polymers, provided there exists a suitable solvent capable of dissolving said polymer. The fibers may also beneficially possess reactive functionalities, either built into the polymer chains or added to the formulation in the form of crosslinking or other reactive groups, that allow the fibers to fuse to each other or to a surrounding matrix upon expansion into hollow fibers or microtubes.

Expansion of the fibers of the invention into hollow microtubes occurs with the reduction in pressure, application of heat, or some other triggering energy such that the pressure differential between the inside and outside walls of the fiber(s) is great enough to expand the fiber walls to form a hollow fiber. For example, in one preferred embodiment of this invention, a liquid propellant trapped inside a fiber may be heated sufficiently to generate a vapor pressure capable of expanding the fiber walls outward, thereby producing a hollow fiber.

This invention makes possible a broad selection of fiber compositions. It may be used to obtain hollow fibers made from conventional thermoplastics, thermosets, elastomers, naturally occurring polymers, engineering thermoplastics, or mixtures of these or other polymers. The polymer and propellant may further be chosen to give a wide range of blowing temperatures at which the polymer softens and the fibers expand to produce hollow fibers.

These and other benefits of the invention will be made apparent in the detailed description of the invention that follows.

DETAILED DESCRIPTION OF THE INVENTION

The present invention is directed to the production of expandable fibers capable of expanding into hollow fibers and, optionally, fusing with adjacent hollow fibers or the surrounding matrix upon the application of heat. These expandable, optionally fusible fibers are synthesized by using purely physical processes. The present invention is unique in that it uses commercially available, pre-polymerized materials in a physical process governed solely by solution thermodynamics for the economical manufacture of expandable and optionally fusible fibers.

A. Formulation

I. With Liquid Blowing Agents

Polymeric fibers containing liquid blowing agents are produced by first forming a solution consisting of the polymer that is to form the hollow fiber shell walls and a suitable solvent. The wall-forming polymer may be a thermoplastic, a thermoset, an elastomer, or a mixture of polymers, optionally mixed with cross-linkers (i.e., thermosettable precursors), plasticizers, or other desirable additives. A suitable solvent is one capable of dissolving the polymer to form a polymer solution that is homogeneous on a macroscopic scale and is free-flowing. The polymer may be solvated to a concentration between about 0.5 and 95 wt %. More preferably, the polymer is solvated at as high a concentration as possible where the mixture may still be extruded at the desired fiber size and geometry, and at a suitable rate. Typically, less concentrated solutions (i.e., less polymer) will allow for faster extrusion and smaller diameter fibers due to their lower viscosity. More concentrated mixtures have the advantage of providing a higher solution viscosity and requiring less solvent removal. For practical application, these trade-offs usually result in a solution having between about 20% and 60% polymer, although exceptions will exist for certain formulations. When the fibers are drawn at elevated temperatures, the solvent usage can be greatly minimized.

In accordance with the present invention, an inert liquid blowing agent (or propellant) is also added to the solvated polymer solution. By "inert" it is meant that the blowing agent does not chemically react with either the polymer solvent or the polymer during the normal course of fiber formation and processing. The blowing agent is selected such that it is miscible with the polymer solvent, but incompatible with the pure polymer, i.e., it does not act as a solvent for the polymer. The blowing agent is also typically selected such that it disperses in the polymer-solvent solution with no phase separation up to its desired concentration. The blowing agent is further chosen such that it produces a vapor pressure sufficient to expand the polymer walls at or above the temperature at which the polymer softens.

The concentration of blowing agent in the polymer-solvent solution is chosen according to the desired amount of fiber expansion, i.e. the desired aspect ratio of the void inside the fiber versus the fiber diameter. The blowing agent concentration must be high enough that the desired amount of expansion is achieved upon vaporizing the blowing agent. However, the blowing agent concentration must be low enough that the polymer is able to form a coherent wall around the blowing agent within the fiber. The polymer wall must also be sufficiently thick so as to withstand, without rupture, the wall thinning which accompanies expansion. It is recognized that the concentration of the blowing agent necessary to provide a given amount of expansion will depend on the volume change upon vaporization of the liquid propellant, as well as the resistance to stretching exhibited by the polymer. It is also recognized that some of the polymer solvent may remain entrapped within the dried fiber along with the propellant itself, which will act to provide additional expansion in conjunction with the liquid blowing agent. Therefore, exact blowing agent concentrations providing a given amount of expansion must to some extent be empirically determined and optimized for each system in order to achieve the best possible performance. Methods for doing so are known in the art and do not require undue experimentation. For the purposes of this invention and with these constraints in mind, the blowing agent concentration, as given by the ratio of its weight to the weight of polymer added to the solution, is preferably within the range of 1 to 200%. More preferably, the blowing agent to polymer weight ratio shall be between 2 and 100%, and most preferably between 5 and 100%.

Thus, the solution used to produce expandable, optionally fusible fibers containing liquid blowing agents in accordance with this invention comprises the following components: a polymer or polymer mixture that is to form the fiber walls, a liquid blowing agent or propellant that creates a vapor pressure sufficient to expand the fiber walls upon heating, optional additives to promote crosslinking or other desirable properties, and a solvent that solvates both the polymer and the liquid propellant to form a homogeneous, free-flowing solution.

There are also systems where the solvent may serve the role of an expanding agent. Alternatively, where small-molecule crosslinkers or precursors are added, the system may not need a solvent because the reactive diluents may lower the mixture viscosity sufficiently to allow fiber spinning without the need for further viscosity reduction or compatibilization.

II. With Solid Blowing Agents

Polymeric fibers having blowing agent cores that are solid at room temperature are produced by first forming a solution consisting of the polymer that is to form the hollow fiber microtube shell walls and a suitable solvent. The wall-forming polymer may be a thermoplastic, a thermoset, an elastomer, or a mixture of polymers, optionally mixed with cross-linkers (i.e., thermosettable precursors), plasticizers, or other desirable additives. A suitable solvent is one capable of dissolving the polymer to form a polymer solution that is homogeneous on a macroscopic scale and is free-flowing. The polymer may be solvated to a concentration between about 0.5 and 95 wt %. More preferably, the polymer is solvated at as high a concentration as possible where the mixture may still be extruded at the desired fiber size and geometry, and at a suitable rate. Typically, less concentrated solutions (i.e., less polymer) will allow for faster extrusion and smaller diameter fibers due to their lower viscosity. More concentrated mixtures have the advantage of providing a higher solution viscosity and requiring less solvent removal. For practical application, these trade-offs usually result in a solution having between about 20% and 60% polymer, although exceptions will exist for certain formulations. When the fibers are drawn at elevated temperatures, the solvent usage can be greatly minimized.

In accordance with the present invention, an inert solid blowing agent (or propellant) is also added to the solvated polymer solution. By "inert" it is meant that the blowing agent does not chemically react with either the polymer solvent or the polymer during the normal course of fiber formation and processing. The blowing agent may be insoluble in the polymer solvent, in which case it should be in the form of a finely divided powder, strands, or fibers having a sufficiently small particle size. In this case, efficient dispersion of the solid propellant may be aided by first treating the propellant with a surface-active agent before mixing with the polymer solution, or by adding surfactants into the total mixture. Ultrasonic agitation can also be used to speed up dispersion. Alternatively, the blowing agent may be soluble in the polymer solvent such that it dissolves in the polymer-solvent solution with no phase separation up to its desired concentration.

The blowing agent is further chosen such that it produces a vapor pressure sufficient to expand the polymer shell walls at or above the temperature at which the polymer softens. The vapor pressure generated upon heating may be caused by the evaporation or sublimation of the propellant (physical blowing agent), or may be generated by a thermally-induced chemical decomposition of the propellant (chemical blowing agent), in which case a sufficient quantity of gas is produced by the decomposition reaction to expand the fiber walls.

The concentration of blowing agent in the polymer-solvent solution is chosen according to the desired amount of fiber expansion, i.e. the desired aspect ratio of the void inside the fiber versus the fiber diameter. The blowing agent concentration must be high enough that the desired amount of expansion is achieved upon vaporizing the blowing agent. However, the blowing agent concentration must be low enough that the polymer is able to form a coherent wall around the blowing agent within the fiber. The polymer shell wall must also be sufficiently thick so as to withstand, without rupture, the shell wall thinning which accompanies expansion. It is recognized that the concentration of the blowing agent necessary to provide a given amount of expansion will depend on the volume of gas produced upon vaporization or decomposition of the propellant, as well as the resistance to stretching exhibited by the polymer. It is also recognized that some of the polymer solvent may remain entrapped within the dried fiber along with the propellant itself, which will act to provide additional expansion in conjunction with the solid blowing agent. Therefore, the exact blowing agent loading level which provides a given amount of expansion must to some extent be empirically determined and optimized for each system in order to achieve the best possible performance. Methods for doing so are known in the art and do not require undue experimentation. For the purposes of this invention and with these constraints in mind, the blowing agent concentration, as given by the ratio of its weight to the weight of polymer added to the solution, is preferably within the range of 1 to 200%.

Thus, the solution or mixture used to produce expandable, optionally fusible fibers in accordance with this invention comprises, in another embodiment, the following components: a polymer or polymer mixture that is to form the hollow fiber shell walls, a blowing agent or propellant that generates a vapor pressure sufficient to expand the fiber walls upon heating (said blowing agent or propellant being normally a solid at or near ambient pressure and temperature), optional additives to promote crosslinking or other desirable properties, and a solvent that solvates the polymer (and optionally the solid propellant) to form a free-flowing mixture.

B. Fiber Formation

In accordance with this invention, expandable, optionally fusible fibers are manufactured by extruding or otherwise ejecting the solution or mixture from Section A above through an orifice having the desired cross-sectional geometry. The purpose of this step is to form strands of the solution having the desired cross-sectional shape. The strands may be nominally continuous or may be chopped or pinched at regular intervals to produce fibers of a desired length. The fibers may be spun through a single orifice or may be ejected through multiple orifices to produce a plurality of fibers concurrently.

By controlling the orifice size, the viscosity of the solvent-polymer-propellant solution, and the extrusion rate of the solution, the fiber diameter may be closely regulated. In particular, by extruding solutions with moderate to low viscosities through a small orifice, very small fibers may be produced, which fibers are not easily produced by conventional means. The fibers may further achieve small dimensions by virtue of their resistance to rupture or breakage. Because the fibers are solid (not hollow) upon initially exiting the orifice, the fibers may be drawn (stretched) to an even smaller diameter than that dictated by the orifice opening. Once the ejection and draw-down process have been substantially completed, the fiber may then be expanded to create a hollow, tubular geometry. This is a significant advantage over conventional technology because the limitations of the annular extrusion process and difficulties associated with the draw-down of hollow fibers severely limit the economical production of small-diameter hollow fibers.

Extruding the polymer mixture into strands provides an efficient avenue for the removal of the solvent from the mixture by evaporation or extraction. As the solvent is removed from the strands, phase separation occurs whereby the polymer no longer stays in solution within each strand. Because solvent removal occurs at the strand surface during drying or extraction processes, the polymer will typically phase separate at the strand surface first, creating a thin polymer wall surrounding the core. Alternatively, the polymer may precipitate within the strand and migrate to the strand surface. Further drying occurs as the remaining solvent in the strand interior diffuses through the polymer wall to the surface and evaporates or is extracted. Diffusion of the solvent through the polymer occurs readily in this case because the solvent is compatible with the polymer, and because the radial diffusion distance in the strand is short.

Where the blowing agent is a liquid, the agent is essentially trapped within the strand during drying due to its incompatibility with the polymer, which greatly hinders its permeability through the polymer shell wall.

Where the blowing agent is a solid, the agent does not leave the strand to any appreciable degree during drying due to the non-volatility of the solid blowing agent. In the case where a polymer solvent-soluble solid propellant is used, the solid propellant will precipitate out of solution as the solvent leaves the strand. In the case where the solid propellant is insoluble in the polymer solvent, the solid particles will be initially coated with the polymer solution and a polymer coating will be left behind as the solvent is dried or extracted. The use of cylindrically-shaped solid propellants in this case will facilitate their orientation parallel to the direction of fiber extrusion. Thus, drying or extraction of the polymer solvent leads to the formation of a polymeric wall. When most of the solvent has been removed, the final product consists of a polymer wall surrounding a continuous series of pockets or particles of the solid blowing agent.

In one embodiment of this invention, the propellant may exist as a strand itself. For example, a cloth thread may be impregnated with conventional liquid and/or solid propellants to produce a continuous thread containing the blowing agent(s). This thread may then be coated with the polymer solution by extrusion techniques similar to those used for wire coating applications. Upon evaporating the solvent, the resultant product is a fiber consisting of a polymer wall surrounding a blowing agent core, which may subsequently be triggered to expand and form a hollow fiber.

The extent to which additional components remain in the strands during solvent removal will depend on their volatility, compatibility with the polymer and blowing agent, and diffusivity in the polymer, among other things. Additives such as crosslinkers, catalysts, plasticizers, pigments, etc., will generally remain within the strand upon solvent removal since these agents typically have low volatilities.

In a presently preferred embodiment of this invention, the formation of strands is achieved by ejecting the polymer solution through a circular orifice into a drying gas atmosphere where solvent removal proceeds by simple evaporative drying. A particular advantage of this embodiment is that the strand is automatically cooled as the solvent evaporates due to the latent heat of vaporization associated with the solvent phase change. Thus, heated gases may be used to facilitate fiber drying without unduly raising the fiber temperature and thereby expanding the fibers prematurely. Alternatively, fiber expansion may be desirably triggered in conjunction with the solvent removal process. For instance, if a sufficiently hot gas stream is flowed over the strands after extrusion (and after or during an optional draw-down process), or an initially hot mixture is extruded out of an orifice, the solvent will be evaporated from the strands, and the strands will be sufficiently heated to trigger the blowing agent. In yet another embodiment, the mixture may be extruded from a state of high pressure through an orifice to a state of low pressure, where the pressure change will aid in the expansion of the fiber after exiting the orifice. By judicial choice of the solvent, polymer, and blowing agent combination, the system may be designed to expand while a significant fraction of solvent remains within the strand, which can be advantageously used as a plasticizer for the polymer wall to facilitate the wall expansion. Further heating will remove the rest of the solvent, yielding a hollow fiber produced in a single, continuous, economical process.

Strand formation may be alternatively accomplished by introducing the polymer-propellant-solvent solution into a second, immiscible liquid in which the polymer and propellant are immiscible and the polymer solvent is only slightly soluble. The extrusion of the polymer solution occurs just as described above, with optional draw-down of the strands to produce small diameters as desired. The second liquid shall be chosen such that it is not a solvent for the polymer, and is somewhat incompatible with the solvent such that the overall polymer solution remains as discrete strands with the second liquid. The second liquid must, however, provide a reasonable solubility for the polymer solvent such that the polymer solvent is extracted from the strands in a manner analogous to evaporative drying. That is, as the strands make contact with the second, immiscible liquid, the polymer solvent is extracted from the strands at their surfaces.

Once sufficient solvent has been removed, the polymer will phase separate and form a polymer wall at the strand surface, as in the case of evaporative drying. Further extraction of the solvent through the polymer wall results in fibers composed of a polymer wall surrounding, in one embodiment, the liquid blowing agent. The liquid propellant will not be substantially extracted into the second liquid due to its incompatibility and low permeability in the polymeric walls. In another embodiment, removal of the solvent results in fibers composed of a polymer wall surrounding a continuous series of pockets or particles of the solid blowing agent. The solid propellant will not be substantially extracted into the second liquid due to its extremely low permeability in the polymeric walls. The extent to which additional components remain in the strands during solvent extraction will depend on the their diffusivity in the polymer and compatibility with the polymer, the blowing agent, and the second liquid medium, among other things. Additives such as crosslinkers, catalysts, plasticizers, pigments, etc., will generally remain within the strand upon solvent removal since these agents are typically chosen to be compatible with the polymer or polymer solvent, and diffusion constraints will limit their extraction into the second liquid even if compatibility exists.

This second liquid may be advantageously selected to be water, as many of the known polymer solvents are immiscible with and only slightly soluble in water. Other examples include hydrophobic liquids such as fluorocarbons and silicone fluids. One knowledgeable in the art will be able to select other liquids which meet these criteria, and which will advantageously perform in the manner described above in accordance with this invention.

In order to achieve sufficient pressure within the fiber to expand the polymer walls, it may be advantageous to pinch off the fiber at its ends so that the propellant is effectively sealed inside the fiber. For this purpose the strand may be pinched at each end after extrusion from the orifice, either during or after solvent removal. Alternatively, the strand may, at regular intervals, be crimped only enough to seal off the internal propellant cavities from each other, but not so much as to actually break the fiber. This would have the effect of producing a fiber that has a series of propellant pockets sealed off and independent from one another, while the fiber remains a single, continuous strand.

C. Hollow Fiber or Composite Formation

The hollow fibers or microtubes of the invention are prepared by heating the thermo-expandable fibers, either by themselves or admixed with a matrix resin or other binder composition. Upon heating, the polymeric wall material of the fiber softens and stretches under the expansion force created by the blowing agent, forming a hollow fiber or microtube characterized by one or a series of gaseous interior voids surrounded by a polymer shell. Having gone through this expansion, the hollow fibers are larger in cross-sectional area than the unexpanded fibers and have a lower true density.

In one embodiment of the present invention, before, during, or after microtube formation (i.e., fiber expansion), the shell walls of the microtubes join with one another (melt or fuse together) to form a semi-continuous sheet or foam. Upon cooling, the microtube walls harden to give a microcellular foam, said foam being characterized by a plurality of fused hollow fibers. Such a foam can be formed that is at least two to three times the original volume of the unexpanded fibers. Alternatively, a given geometry can be produced where, when produced using the hollow fibers, the overall weight is less than if the equivalent geometry were produced with conventional solid (non-hollow) fibers.

Such a foam, consisting of fused microtubes, will exhibit voids associated with the microtube interiors. Additional voids may exist in the extra-cellular regions where the microtube shells do not merge completely. While the voids associated with the microtube interiors will be singular and discrete (i.e., generally not connected to each other), the voids attributable to the extracellular regions may be interconnected to the extent that a semi-continuous void structure is formed. Fusing of the microtubes' walls may occur by simple physical means (in the case of semi-molten surfaces coming into contact), or may occur with the help of crosslinking reactions between the adjacent hollow fibers.

The unexpanded fibers may be blown, sprayed, dusted, or otherwise spread onto curved or flat surfaces, stamped into cavities or molds, into tubes or pipes, or otherwise into difficult-to-reach places. Once in place, the fibers may be heated to create a microcellular foam which fills in the voids within a given constrained space to give the foam in a desired geometry. The expandable fibers may also be expanded independent of one another and subsequently bunched together to give an ultra-low-weight insulating material. A layered sheet or bunch of such fibers will provide a material with desirable properties like thermal insulation, acoustic damping (sound insulation), and vibration damping (mechanical insulation), among others, while contributing relatively little to the overall weight of the final article. Such materials may find beneficial use in apparel, construction, automotive, aerospace or other industries.

A particularly significant feature of the hollow fibers produced by the present invention is that such hollow fibers have beneficial properties compared to the hollow fibers produced by conventional means. The expansion process is significant because the resulting polymeric shell walls of the hollow fibers will consist of biaxially oriented polymer chains. That is, the polymer chains in the shell walls of the hollow fibers produced by this invention will not only be oriented longitudinally by the extrusion/draw-down process (as with conventionally produced hollow fibers), but will also be oriented radially due to the radial stretching accompanying the expansion process. Conventional hollow fibers that are produced in the current art by extrusion through an annular die and subsequent draw-down will necessarily have polymer chains that are uniaxially oriented in the longitudinal direction. Such hollow fibers will not have any radial orientation among the polymer chains making up the shell wall. This is an important feature of the articles produced by the presently disclosed invention because hollow fibers or microtubes made from polymer chains which are at least partially oriented in the radial direction can be much stronger and much less prone to crushing, kinking, collapse, fraying or other failures or defects than their uniaxially-oriented counterparts.

Alternatively, in another embodiment of the present invention, when the fibers are expanded within a surrounding matrix, the fiber polymeric walls may react with the matrix formulation to create a shell wall that is fused with the surrounding matrix. The result is a microcellular, foamed composite material where the voids within the resin are individual microtubes having walls that are integrally bonded with the surrounding matrix. Thus, conventional composites that use both solid (non-hollow) fibers for strength and expandable microspheres for density reduction as two separate additives may now be produced with only a single additive—expandable fibers. Furthermore, by utilizing fusible, expandable fibers that react with the matrix material, an overall stronger composite material may be produced because bonding with the matrix can eliminate delamination between the resulting hollow fibers or microtubes and the matrix resin. Such bonding may also help prevent crack initiation within the resin, or may help mitigate crack propagation once a crack tip develops.

Alternatively, the matrix resin may be thought of as a binder that bonds to or holds together the expanded microtubes to give a foamed composite material. The resulting composite may or may not contain voids outside the microtubes, depending on the nature of the matrix resin and the mixing conditions used. Such composites may be thought of as non-woven fabrics or sheets that provide the strength of traditional fabrics, and have the added benefit of a low-density material with good insulation properties that is strong, lightweight, yet is so produced without the time-consuming weaving process.

D. Material Selection

The polymers that may be used to form expandable fibers in accordance with this invention are numerous. In short, any polymer or polymer mixture for which there is a suitable solvent or solvent mixture, and which softens and is at least slightly stretchable upon the application of heat, may be formed into an expanding, optionally fusible fiber using the techniques provided by this disclosure. Examples of the polymers which may be used include homopolymers such as, but not limited to, polystyrene ($\alpha$-methyl, brominated), polybutadiene, poly(meth)acrylates, poly(meth)acrylic acids, poly(meth)acrylamides, poly(meth)acrylonitrile, polyethylene (propylene or butylene), polyesters, polyolefins, polyvinylidene fluoride or chloride, polyvinyl alcohol, polyvinyl acetate, polyvinyl ether, polyethylene terephthalate (PET), polybutylene terephthalate (PBT), or blends or copolymers of these or other homopolymers thereof. Such polymers enabled by the technology disclosed in the present invention may be blocky (diblock, triblock, or multiblock), alternating or random copolymers, terpolymers, starpolymers, etc., such as styrene-butadiene (SBR), styrene-acrylonitrile, butadiene-acrylonitrile, styrene-maleic anhydride (SMA), ethylene-(meth)acrylic acid, acrylonitrile-butadiene-styrene (ABS), and other copolymers or blends of polymers and/or copolymers thereof.

Naturally occurring polymers, such as polysaccharides (e.g., celluloses, modified celluloses, starches, chitin, chitosan, etc.), lipids, or proteins or other polypeptides for example, may also be used in accordance with the present invention. This class of polymers is significant in that they are not man-made, but rather are obtained from renewable resources, and are generally not reproducible by synthetic means. Another benefit of naturally occurring polymers is their inherent biocompatibility and biodegradability, properties not often achieved with conventionally polymerized thermoplastics.

Another very important class of polymers which becomes available for use in the production of expandable fibers by the present invention is the class of polymers known as engineering thermoplastics. These polymers have a special significance because of their high dimensional stability, good chemical resistance, good impact strength, high strength at elevated temperatures, and other superlative engineering properties, which may be advantageously incorporated into hollow fibers or microcellular foams for further property enhancement. Examples of such thermoplastics enabled for use by the present invention include, but are not limited to, polymers such as nylon, polycarbonate, polyamide, polysulfone (polyethersulfone, polyphenylsulfone, polyphenylene ether-sulfone, etc.), polyetherimide, polyketone, polyetherketone, and other engineering thermoplastics thereof.

Polymers which contain one or more reactive functionalities built into the polymer chains will be particularly beneficial in the practice of this invention because such groups can react with a surrounding matrix or can react with suitable crosslinkers to more effectively fuse together the microtubes walls with any adjacent constituents. Such reactive groups could be, for example, alcohols, anhydrides, vinyls, amines, caboxylates, sulfhydryls, aldehydes, epoxies, etc. Specific polymer examples include styrene-maleic anhydride co-polymers (maleic anhydride functionalities), hydrolyzed poly vinyl acetates/poly vinyl alcohol (hydroxyl functionalities), polyethylene imines (primary, secondary, and tertiary amine functionalities), and naturally occurring polymers such as the celluloses and proteins (hydroxyl, carboxyl, amine, sulfhydryl, and other functionalities). The reactive functionalities enable the bonding or reaction of the microtube shell walls to an appropriately chosen surrounding matrix or to each other. Alternatively, two types of fibers can be manufactured, one possessing one type of functionality (primary or secondary amines, for example) and another possessing a different type of functionality (anhydrides, for example). The two types of fibers may then be mixed with each other by simple mechanical means. When this mixture is heated, the microtubes so produced will fuse and react with adjacent microtubes having the opposite functionality, forming a crosslinked microcellular foam.

A particular fiber composition which may be advantageously exploited by the present invention is one in which the fiber walls are comprised of one or more polymers mixed with one or more reactive components. The reactive components may be of the monomer, crosslinker, reactive oligomer, or oligomeric crosslinker types. Such reactive components may be mono- or multi-functional, having one or more reactive groups per entity. They may be incorporated into the fiber wall material in order to provide crosslinking between the polymer chains, or to form an interpenetrating polymer network (IPN) or semi-interpenetrating polymer network (semi-IPN—produced by the polymerization of the reactive components primarily with themselves) within and/or across the microtube walls to adjacent microtubes. The reactive components may also be used to provide reaction with and bonding to the surrounding matrix.

By adding small quantities of thermal or photo-initiators, catalysts or other synergists, the crosslinking reaction or IPN or semi-IPN formation may be designed to proceed during or after the heating and expansion of the fibers. For example, a thermal initiator may be used which activates crosslinking at a temperature about equal to or higher than the fiber expansion temperature, such that the fiber shell walls crosslink only during or after expansion. Photo-initiators may also be incorporated, which make the crosslinking reactions mostly independent of the temperature and allow them to proceed only when the fibers are exposed to a source of polymerizing energy either before or after expansion has taken place.

The advantages of incorporating reactive components into the polymeric wall material are primarily attributable to the formation of a crosslinked polymer shell wall (i.e., thermoset formation). For some applications thermosetting polymers have more desirable properties than thermoplastic-type polymers, including increased dimensional stability, high-temperature performance, chemical resistance, and durability. A lightly crosslinked shell wall, IPN, or semi-IPN can also provide improved solvent resistance prior to fiber expansion when the crosslinking reactions or IPN formation are triggered independently from, just prior to, or concurrently with the fiber expansion step.

Examples of reactive components that may be mixed with one or more polymers to make up a fiber shell wall material are numerous, and only a few will be listed here. However, this invention is not limited to only those listed. For certain crosslinking reactions, di-functional crosslinkers may be employed such as diols, diepoxies, diisocyanates, di-anhydrides, aldehydes, acrylates, methacrylates, melamines, etc., such as: ethylene glycol, propylene glycol, triethylene glycol, tetraethylene glycol, butanediol diglycidyl ether, bisphenol A diglycidyl ether, partially or completely methylated or butylated melamines, epichlorohydrin, glutaraldehyde, and many others. For IPN or semi-IPN formation, the reactive functional groups may be chosen from acrylate, methacrylate, vinyl ether, vinyl, diene, allyl, epoxy, alcohol, amine, caboxyl, isocyanate, melamine, or others. The reactive components may be used singly or in mixtures. Below are listed acrylate-functional components, but similar structures with other reactive groups could alternatively be used in their place. These include, but are not limited to: ethyl acrylate, propyl acrylate, butyl acrylate, isodecyl acrylate, hexadecyl acrylate, isobornyl acrylate, tetrahydrofurfural acrylate, methyl methacrylate, hydroxy ethyl methacrylate, hydroxy propyl acrylate, polyethylene glycol diacrylate, methylene bisacrylamide, hexanediol diacrylate, polybutadiene diacrylate, bisphenol A diacrylate, trimethylolpropane triacrylate, pentaerythritol tetraacrylate, etc. Other examples include silicates such as trimethoxy-silane, dimethoxy-silane, triethoxy-silane, trichlorosilane, etc. These and other suitable reactive compounds are commercially available from companies such as Sartomer, Henkel, Radcure, Gelest, Allied Signal, Aldrich, and others.

Photo-initiators such as the Irgacure and Darocure series are well-known and commercially available from Ciba Geigy, as is the Escacure series from Sartomer. Thermal initiators such as azobisisobutyronitrile (AIBN) benzoyl peroxide, dicumyl peroxide, t-butyl hydroperoxide, and potassium persulfate are also well-known and are available from common chemical suppliers, as are catalysts which may be desirably incorporated to facilitate the crosslinking, IPN, or semi-IPN reactions.

These and other desirable formulations of polymers, polymer mixtures, or polymer compositions with reactive components may not be readily used in the economical manufacture of expandable fibers using conventional technology because, to the authors' knowledge, no such technology currently exists. Furthermore, as to the production of hollow fibers, the current state of the art is greatly hindered by the required extrusion process using an annular die, which makes the production of fibers having a small cross-sectional area very difficult. Such processes are also sensitive to the polymer composition being extruded, limiting the variety of compositions available for practice. Thus, the present invention provides a much-needed and much-desired method for incorporating such polymers or polymer mixtures into the shell wall materials of hollow fibers or microtubes. After fiber expansion, the resulting microtube will greatly benefit from the favorable properties exhibited by such polymer compositions, yielding hollow fiber shell walls and/or microcellular foams with properties heretofore unattainable through conventional technologies prominently known in the art.

The single requirement with respect to polymer selection in accordance with the current invention is that a suitable solvent or solvent combination must exist for the said polymer or polymer mixture. The solvent must be capable of solvating the polymer to form a nominally homogenous, free-flowing liquid, which in turn must be capable of being extruded into strands of the desired size. Solvent selection will depend on the polymer chosen to form the fiber shell walls, and may also be influenced by factors such as volatility, flammability, viscosity, toxicity, chemical reactivity, recoverability, cost, and interactions with the blowing agent or other components. Typical solvents which may be used in the practice of this invention include, but are not limited to: acetone, methyl ethyl ketone, ethyl ether, tetrahydrofuran, dimethyl sulfoxide, dimethyl formamide, dimethyl acetamide, methyl acetate, ethyl acetate, propyl acetate, butyl acetate, methanol, ethanol, iso-propanol, toluene, methylene chloride, chloroform, dichloroethane, trichloroethane, tetrachloroethylene, water, and others. The present invention places no requirements on the solvent selected, although it is recognized that certain solvents will be more preferable than others based on the above-stated criteria. It is also recognized that in some situations it may be advantageous or necessary to use a mixture of two or more solvents instead of a single solvent in order to obtain the desired solvation, evaporation, and/or extraction properties.

The final component, which must be added to the polymer-solvent mixture, aside from any of the optional additives as mentioned above, is the blowing agent or propellant. When a liquid blowing agent is used, it is typically chosen to be incompatible with the polymer. That is, it does not solvate the polymer to any appreciable degree. This is not an absolute requirement in accordance with the present invention; however, the use of blowing agent-polymer combinations which are incompatible will generally lead to a longer shelf-life for the polymer fibers since, in this case, the blowing agent will exhibit greatly reduced diffusion through the polymer shell walls. Thus, the choice of expanding agent will vary depending on the nature of the polymer chosen to form the fiber walls, as well as the solvent chosen to solvate said polymer. When solid propellants are to be used, the interactions with the polymer are much less important since the solid propellants will not typically act to solvate the polymer wall.

One important consideration when selecting a liquid blowing agent or propellant is that it must produce a vapor pressure sufficient to expand the polymer walls once the polymer has softened due to heating. Propellant selection in this regard will thus depend on the softening temperature of the polymer chosen to form the fiber walls as well as the vapor pressure of the liquid propellant at this softening temperature. Typically, a solvent that has a boiling point at atmospheric pressure of no more than 10 degrees above the softening temperature (or glass transition temperature, $T_g$) of the polymer will provide a sufficient vapor pressure to expand said polymer walls upon heating the fibers to the boiling point of the blowing agent. More preferably, the boiling point of the propellant liquid at atmospheric pressure will be equal to or less than the polymer $T_g$, and even more preferably, the propellant boiling point will be at least 10 degrees lower than the polymer $T_g$. Note that the glass transition temperature of the polymer in question will be altered if a significant amount of solvent remains within the polymer walls. In most cases this will be beneficial to the process by lowering the glass transition temperature at which the polymer softens, thus requiring less heat consumption to achieve expansion of the fibers. In cases where lower glass transition temperatures are not desirable, the $T_g$ depression can be avoided by removing substantially all of the solvent from the fiber composition prior to expansion. For this purpose, a particularly volatile solvent may be beneficially employed as the polymer solvent.

Particularly preferred liquid blowing agents are the small chain hydrocarbons since they are inert towards most polymers, miscible with most solvents, and have boiling points near ambient temperatures. For liquid blowing agents that have boiling points below ambient temperatures, the process may advantageously be carried out at low temperatures and/or under a pressurized atmosphere. Examples of liquid propellants that may be used in conjunction with the polymers and solvents listed above include, but are not limited to, hydrocarbons (n-butane, iso-butane, n-pentane, iso-pentane, trimethyl-2-pentene, hexane, heptane, n-octane, iso-octane, nonane, decane, benzene, toluene, etc.), ethers and ketones (ethyl ether, isopropyl ether, acetone, methyl ethyl ketone, etc.), alcohols (methanol, ethanol, iso-propanol, etc.), halogentated hydrocarbons (methylene chloride, chloroform, carbon tetrachloride, dichloroethane, trichloroethane, tetrachloroethane, tetrachloroethylene, trichlorofluoromethane, dichlorodifluorodimethane, etc.), ammonia or ammonia-based liquids, silane or siloxane-based liquids (hexamethyl disilane, hexamethyl disiloxane), and water or other aqueous mixtures. These examples are not meant to be exhaustive, for one skilled in the art will know of many liquids which will exhibit miscibility with a given polymer-solvent mixture while also exhibiting incompatibility with the pure polymer, and at the same time exerting a vapor pressure sufficient to expand the polymer walls at or above the softening temperature of the polymer.

The two main types of solid propellants are physical blowing agents and chemical blowing agents. Physical blowing agents are those which produce a vapor by changing phase upon heating. There are a vast number of chemicals that exist as a solid at room temperature, yet vaporize upon reaching temperatures typically used to soften most polymers. Some solid blowing agents of this type pass through an intermediate liquid state upon heating, while others sublime directly to a gas upon heating. Examples of suitable physical blowing agents include, but are not limited to: neopentyl alcohol, hexamethyl ethane, tertiary-butyl carbazate, tertiary-butyl dimethylsilyl chloride, tertiary-butyl N-allylcarbamate, and tetramethyl-1,3-cyclobutanedione, etc. This list is not meant to be exhaustive as one knowledgeable in the field of chemistry will find many substances that meet the criteria so-described. In selecting a suitable physical blowing agent, consideration may be given to toxicity, polymer compatibility, solvent compatibility, melting point, boiling point, vapor pressure, or other issues, depending on the particular polymer-solvent system under consideration.

Chemical blowing agents, typically solid at ambient pressure and temperature, undergo decomposition or other chemical reactions that produce gaseous vapors as at least one of the reaction by-products. These reactions are most often triggered by heat, but can alternatively be triggered by the presence of a co-reactant. For instance, a chemical blowing agent could be triggered by the presence of water, whereby water is included in the formulation but only becomes available for reaction upon the addition of heat. (Such would be the case for certain hydrated salt compounds mixed with the chemical blowing agent sodium borohydride, for example.) Chemical propellants can be categorized as either organic or inorganic chemical blowing agents. Inorganic chemical blowing agents typically decompose to give off carbon dioxide gas in an endothermic reaction. Organic chemical blowing agents typically decompose to give off nitrogen gas (which has a lower diffusion rate in most polymers) in an exothermic reaction.

Examples of chemical blowing agents include, but are not limited to: sodium bicarbonate, potassium hydrogencarbonate, sodium borohydride (decomposes upon the addition of a proton donor such as water), polycarbonic acid, ammonium carbonate, ammonium carbamate, ammonium acetate, ammonium diethyldithiocarbamate, dinitrosopentamethylene-tetraamine, p-toluenesulfonyl hydrazide, 4,4'-oxybis(benzenesulfonyl hydrazide), azodicarbonamide, p-toluenesulfonyl semicarbazide, 5-phenyltetrazole, diazoaminobenzene, etc. One advantage of chemical blowing agents is that the carbon dioxide or nitrogen gas typically evolved is inert, nonflammable, and nontoxic. Another advantage is that the inorganic blowing agents can themselves be very inert and nontoxic, which makes them easy and safe to work with during production and in the end-use products.

Solid blowing agents, both physical and chemical (organic and inorganic) avoid the inherent hazards associated with volatile, flammable liquids. Another advantage to be realized by the solid propellants is that the temperature at which fiber expansion occurs may be altered independent of the polymer used to make the fiber walls. In fibers containing liquid propellants, the temperature at which expansion occurs is typically determined by the softening temperature of the polymer. That is, expansion occurs when the polymer walls soften, allowing the vapor pressure of the volatile liquid to stretch the walls outward.

Using the solid propellants described above and in accordance with this invention, however, the polymer-propellant combination may be chosen so that the expansion temperature is dictated by the decomposition temperature of the solid propellant rather than the softening temperature of the polymer. This will occur when the softening temperature of the polymer is below the decomposition temperature of the propellant. As the fibers are heated the polymer may soften, but as long as no gas is generated, no expansion will occur. Only upon heating further, to the decomposition temperature of the propellant, will a vapor pressure sufficient to expand the polymer walls be generated. Thus, by using solid-phase blowing agents which exert virtually no vapor pressure prior to the onset of decomposition, the temperature at which fiber expansion occurs may be controlled by the selection of the propellant rather than by the softening temperature of the polymer. This feature can provide added flexibility in designing the temperature ramp-up cycle during the molding processes used to produce final products.

The greatly decreased volatility of the solid propellants used in accordance with this invention further helps to preserve the shelf-life of the expandable fibers. Since the solid propellants have virtually no vapor pressure and little propensity to permeate through the polymer walls, the long-term shelf-life of unexpanded fibers is expected to be substantially increased. Chemical blowing agents offer an additional advantage over physical blowing agents (liquid or solid) in that they are capable of generating a higher expansion pressure than their physical blowing agent counterparts. This is because physical blowing agents will always be in a state of reversible equilibrium between the liquid and vapor phases. In contrast, the chemical blowing agents decompose to form inert gases in an essentially irreversible process. Because the decomposition is virtually irreversible and the gases produced are very volatile, chemical blowing agents are capable of producing much greater pressures than those generated by even the most volatile physical blowing agents.

In order to incorporate the solid propellants into expandable fibers, they must be mixed with the polymer-solvent mixture. Whether physical or chemical blowing agents are used, the solid propellant may optionally be dissolved in the polymer-solvent mixture. In the case of soluble systems, the blowing agent is simply dissolved up to its desired composition; the mixture is extruded into strands; and the solvent is dried or extracted from the strands. When the solid propellant is not soluble in the polymer-solvent mixture, the solid propellant is typically added to the mixture in the form of a finely divided powder, strands, or fibers. In this case, the size of the propellant particles will be as small as or smaller than the desired fiber size, at least in the cross-sectional dimensions when fiber or strand-shaped propellants are used. If the solid propellant particles are significantly smaller than the strands formed by extrusion through an orifice, then the final fibers will typically contain many solid propellant particles contained within the fibers in a serial fashion. In this case, a hollow fiber may be produced after expansion that comprises many non-connected voids within the interior of the hollow fiber.

Solubility of the propellant in the polymer-solvent mixture, the amount of gas generated, the vapor pressure generated, and the temperature at which vapor generation occurs are all parameters that will influence the selection of an appropriate solid propellant for use in accordance with this invention.

The matrix materials with which these fibers may be incorporated are numerous. Example matrices suitable for fiber incorporation include paints, inks, epoxies, sealants, insulation, potting compounds, spackling compounds, underbody coatings, pulp fibers, dielectric laminates, prosthetic devices, synthetic foams, cultured marble, polymer concretes, and synthetic cements. The matrices may be simple one or two-component mixtures, or may contain any number of additives such as crosslinkers, catalysts, initiators, stabilizers, pigments, fibers, inert fillers, etc.

In one preferred embodiment of this invention, the matrix is an epoxy-based resin mixed with a suitable initiator package. When expandable fibers made from the copolymer styrene-maleic anhydride (also containing crosslinkers, catalysts, etc.) are incorporated into such a matrix and expanded by heating, crosslinking occurs in the bulk of the epoxy matrix, within the hollow fiber shell walls, and across or between the hollow fiber walls and the epoxy matrix. The final product is a fully crosslinked, light-weight composite system wherein the hollow fibers are integrally bonded to the surrounding matrix.

In another preferred embodiment of the present invention, the matrix is a mixture of pulp fibers and, optionally, a sucrose solution. Expandable fibers made from a prolamine, a protein derived from corn also known as Zein (containing suitable crosslinkers, catalysts, etc.) are mixed into the fiber-sucrose solution, and the mixture is transferred to a mold, filling about half of the total mold cavity volume. When the mold is closed and heated, the mixture expands, fills in the entire mold cavity, and sets with crosslinking within the hollow fiber shell walls and between the hollow fiber walls, the pulp fibers, and the sucrose molecules. The resultant material is a crosslinked, biodegradable, lightweight, non-woven fabric that is suitable for use as insulation, drink cups, food containers, packaging material, paper or cardboard products, and other products.

EXAMPLES

The examples below are meant to show representative polymer, blowing agent, and solvent combinations that are capable of forming expandable and optionally fusible fibers. These examples further illustrate the formation of expandable, optionally fusible fibers, as well as the resulting hollow fibers and microcellular foam or foamed composite using commercially available polymer resins and only physical processes governed by solution thermodynamics. Other multi-component mixtures can be formulated and processed in accordance with this invention by those skilled in the art of polymer solution thermodynamics.

Example 1

Expandable Fibers Using a Copolymer

Polystyrene-co-maleic anhydride (SMA) polymer is obtained from Aldrich Chemical Company, Inc., Milwaukee, Wis., Catalog #44,238-0. This product has about a 1.3-to-1 styrene-to-maleic anhydride ratio, and a softening temperature of 154° C. Approximately 2.0 grams of SMA is dissolved in 3 mL of ethyl acetate, and an additional 0.2 mL of iso-octane is dissolved to serve as the blowing agent. After mixing, this solution becomes clear and free-flowing. The solution is ejected through an orifice having a circular opening with a diameter of 0.165 inches, forming a strand of polymer solution. The polymer-blowing agent-solvent solution is extruded into a tall box which has a fan at the bottom blowing ambient air up through the box, out the top of the box where the strand enters, and into a chemical fume hood. The dried fiber is collected at the bottom of the box. The fiber consists of a small, nominally cylindrical fiber ranging in size from about 0.08 to about 0.14 inches in diameter depending on the ejection speed through the orifice. Upon placing into a convection oven and heating to 160° C., the fiber expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

Example 2

Expandable Fibers Using Polycarbonate

Polycarbonate resin is obtained from Bayer Corporation, Pittsburgh, Pa., under the tradename Makrolon. Approximate 2 grams of polycarbonate is solvated in 5 mL of chloroform, and 0.7 mL of 2,4,4 trimethyl-1-pentene is dissolved in the mixture to serve as the liquid blowing agent. After mixing, this solution becomes clear and free-flowing. The solution is ejected through an orifice having a circular opening with a diameter of 0.165 inches, forming a strand of polymer solution. The polymer-blowing agent-solvent solution is extruded into a tall box which has a fan at the bottom blowing ambient air up through the box, out the top of the box and into condenser where the chloroform gas is condensed back into a liquid and recovered. The dried fiber is collected at the bottom of the box. The fiber consists of a small, nominally cylindrical fiber ranging in size from about 0.06 to about 0.12 inches in diameter depending on the ejection speed through the orifice. Upon placing into a convection oven and heating to 160° C., the fiber expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

Example 3

Expandable Fibers Using a Copolymer Mixed with a Reactive Component

Polystyrene-co-maleic anhydride (SMA) polymer is obtained from Elf-Atochem North America, Philadelphia, Pa., Product # SMA3000. This product has about a 3-to-1 styrene-to-maleic anhydride ratio, and a softening temperature of about 110° C. Approximately 4.0 grams of SMA is dissolved in 6 mL of ethyl acetate, and an additional 0.2 mL of iso-octane is dissolved to serve as the blowing agent. Also added are 0.4 grams of hexanediol diacrylate (difunctional polymerizable group, HDODA; Radcure) and 0.02 grams of AIBN (Aldrich). After mixing, this solution becomes clear and free-flowing. The solution is ejected through an orifice having a circular opening with a diameter of 0.165 inches, forming a strand of polymer solution. The polymer-blowing agent-solvent solution is extruded into a tall box which has a fan at the bottom blowing ambient air up through the box, out the top of the box where the strand enters, and into a chemical fume hood. The dried fiber is collected at the bottom of the box. The fiber consists of a small, nominally cylindrical fiber ranging in size from about 0.08 to about 0.14 inches in diameter depending on the ejection speed through the orifice.

The fibers are collected and placed into a convection oven at 90° C. (below the softening temperature of the SMA) for four minutes to cure and crosslink the HDODA. Upon placing into a convection oven and heating to 120° C., the fiber turns clear and expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

Example 4

Expandable Fibers Using a Copolymer Mixed with Crosslinking Components

Polystyrene-co-maleic anhydride (SMA) polymer is obtained from Elf-Atochem North America, Philadelphia, Pa., Product # SMA3000. This product has about a 3-to-1 styrene-to-maleic anhydride ratio, and a softening temperature of about 110° C. Approximately 2.0 grams of SMA is dissolved in 4 mL of methyl acetate, and an additional 0.5 mL of iso-octane is dissolved to serve as the blowing agent. Also added are 0.5 grams of a plasticizer (Santicizer S160, Solutia, Inc. St. Louis, Mich.), 0.2 grams of maleic anhydride-grafted polybutadiene resin (Ricon 131MA5; Ricon Resins Inc., Grand Junction, Colo.) as a crosslinker, 0.07 grams of AIBN (initiator, Aldrich), 0.1 gram of tetraethylene glycol (Aldrich) as a crosslinker, and 0.05 grams of a catalyst, 2,4,6-tris(dimethylaminomethyl)phenol (DMP-30, Aldrich). After mixing, this solution becomes clear and free-flowing. The solution is processed as stated in Example 3 with a similar fiber resulting.

Upon placing into a convection oven and heating to 120° C., the fiber turns clear and expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

When unexpanded fibers are mixed into an epoxy-based resin and heated to 120° C. in a test tube, the resin rises in the test tube (increased in volume), then cures into a hard, foamed composite. The microtubes within the composite are bonded to the epoxy matrix by means of the maleic anhydride groups in the polymer chains, and the polymer chains are crosslinked to each other by the reaction of the tetraethylene glycol with the maleic anhydride units.

Example 5

Expandable Fibers Using Liquid-Liquid Extraction and a Homopolymer

Poly-α-methylstyrene (PMS) polymer is obtained from Aldrich Chemical Company, Inc., Milwaukee, Wis., Catalog #19,184-1. Approximately 2 grams of PMS is solvated in 3 mL of tetrahydrofuran along with 0.9 mL of 2-methyl butane as the blowing agent. The mixture forms a clear, homogeneous solution. Separately, 100 mL of an aqueous solution with 2 wt % PVA (Mowiol surfactant, 88% hydrolyzed PVA, Aldrich Chemical Company, Catalog # 32,459-0) is made and is placed into a trough approximately three feet long.

The polymer solution is slowly ejected using a 10 mL syringe with a 29 gauge, 1.5" needle, forming a thin strand of the polymer solution. As the polymer solution strand is contacted with and pulled through the aqueous phase, the THF solvent is extracted from the strand into the water. The strand turns translucent and then opaque as it passes through the water, indicative of the THF extraction. At the other end of the trough, the strand emerges as a fiber, which can be optionally dried with an air flow.

Upon placing the unexpanded fiber into a convection oven and heating to 120° C., the fiber expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

Example 6

Expandable Fibers Using a Naturally-Occurring Polymer Mixed with a Crosslinking Component A natural protein extracted from corn gluten, known as prolamine or zein (Zein), is obtained from Freeman Industries, LLC, Tuckahoe, N.Y., Product # F4000. This product has a softening temperature of about 105° C. Approximately 1 gram of Zein is dissolved in 0.7 grams of isopropyl alcohol, 0.7 grams of ethyl alcohol, and 0.6 grams of water. About 0.2 grams of glutaric dialdehyde (50% in water, Aldrich product # 34,085-5) and 0.15 grams of ethylene glycol are added to crosslink and plasticize the polymer, respectively. An additional 0.2 grams of 1,1,1-trichloroethane are added to serve as the blowing agent. The solution is processed as stated in Example 3 with a similar fiber resulting.

Upon placing into a convection oven and heating to 120° C., the fiber expands to approximately double its original size to give a hollow fiber or microtube. When multiple fibers are bunched together and heated, the fibers expand and coalesce to form a fused, foamed material that occupies several times the original volume of the unexpanded fibers. The foamed material consists of individual fused microtubes having thin shell walls surrounding one or more internal voids.

When unexpanded fibers are mixed into an epoxy-based resin and heated to 120° C. in a test tube, the resin rises in the test tube (increased in volume), then cures into a hard, foamed composite. Upon filling a rectangular-shaped mold about half full with the fibers so produced, sealing the mold shut, and heating to approximately 120° C., the fibers expand and coalesce, filling the mold cavity. After removal from the mold, the resultant article is a biodegradable foamed sheet having the shape of the internal mold cavity, comprised of fused microtubes which could be seen to have thin shell walls surrounding one or more internal voids.

What is claimed is:

1. A hollow plastic fiber comprising a polymeric shell surrounding a continuous series of internal gaseous voids, the polymeric shell comprising polymer chains that are at least partially radially oriented.

2. A hollow fiber according to claim 1 wherein the hollow fiber is derived from a thermo-expandable fiber, the thermo-expandable fiber characterized by a polymeric wall surrounding a continuous series of pockets of blowing agent, the polymeric wall comprising reactive functionalities.

3. A hollow fiber according to claim 1 wherein the hollow fiber is derived from a thermo-expandable fiber, the thermo-expandable fiber characterized by a polymeric wall comprising a polymer and one or more reactive oligomers or crosslinkable moieties capable of forming a crosslinked, interpenetrating, or semi-interpenetrating polymeric network within the polymeric wall.

4. A hollow fiber according to claim 1 wherein the polymeric shell comprises an engineering thermoplastic polymer.

5. A hollow fiber according to claim 1 wherein the polymeric shell comprises a copolymer, multiblock polymer, or polymer blend.

6. A hollow fiber according to claim 1 wherein the polymeric shell comprises a naturally occurring polymer.

7. A hollow fiber according to claim 6 wherein the naturally occurring polymer is selected from the group consisting of polysaccharides, lipids, and proteins.

8. A hollow fiber according to claim 7 wherein the naturally occurring polymer is Zein.

9. An insulating material comprising a plurality of expanded hollow fibers, each hollow fiber comprising a polymeric shell surrounding a continuous series of internal gaseous voids, the polymeric shell comprising polymer chains that are at least partially radially oriented.

10. An insulating material according to claim 9 wherein the hollow fibers are fused to each other.

11. A hollow plastic fiber according to claim 2 wherein the blowing agent is liquid.

12. A hollow plastic fiber according to claim 2 wherein the blowing agent is a solid at room temperature.

13. A hollow plastic fiber according to claim 2 wherein the blowing agent is insoluble and is in the shape of a cylinder.

14. An insulating material according to claim 9 wherein the hollow fiber is derived from a thermo-expandable fiber, the thermo-expandable fiber characterized by a polymeric wall surrounding one or more pockets of blowing agent, the polymeric wall comprising reactive functionalities.

15. An insulating material according to claim 9 wherein the hollow fiber is derived from a thermo-expandable fiber, the thermo-expandable fiber characterized by a polymeric wall comprising a polymer and one or more reactive oligomers or crosslinkable moieties capable of forming a crosslinked, interpenetrating, or semi-interpenetrating polymeric network within the polymeric wall.

16. An insulating material according to claim 9 wherein the polymeric shell comprises an engineering thermoplastic polymer.

17. An insulating material according to claim 9 wherein the polymeric shell comprises a copolymer, multiblock polymer, or polymer blend.

18. An insulating material according to claim 9 wherein the polymeric shell comprises a naturally occuring polymer.

19. An insulating material according to claim 18 wherein the naturally occuring polymer is selected from the group consisting of polysaccharides, lipids, proteins, and Zein.

20. An insulating material according to claim 14 wherein the blowing agent is a liquid.

21. An insulating material according to claim 14 wherein the blowing agent is a solid at room temperature.

22. An insulating material according to claim 14 wherein the blowing agent is insoluble and is in the shape of a cylinder.

* * * * *